M. HVEEM.
GEARLESS DIFFERENTIAL DEVICE.
APPLICATION FILED DEC. 22, 1915.
1,224,746.
Patented May 1, 1917.
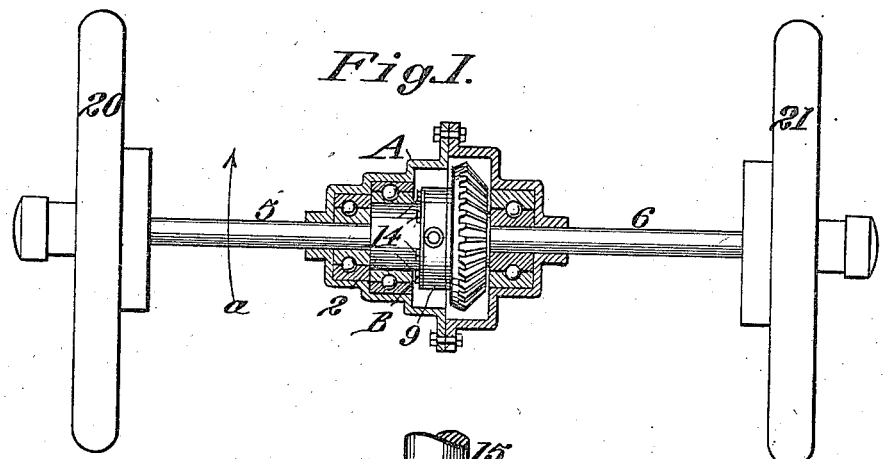
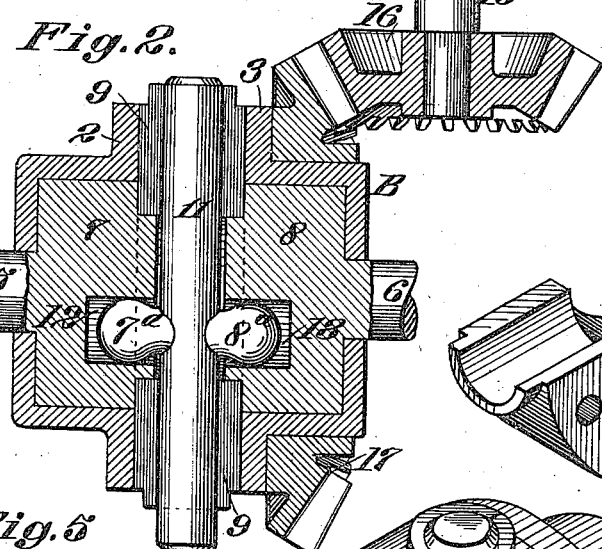
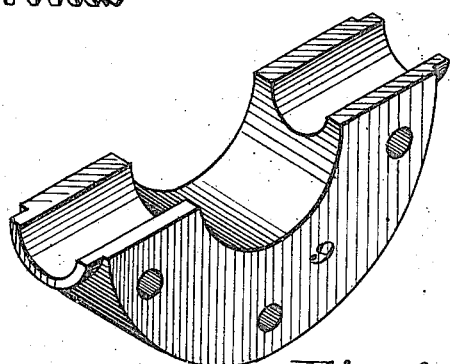
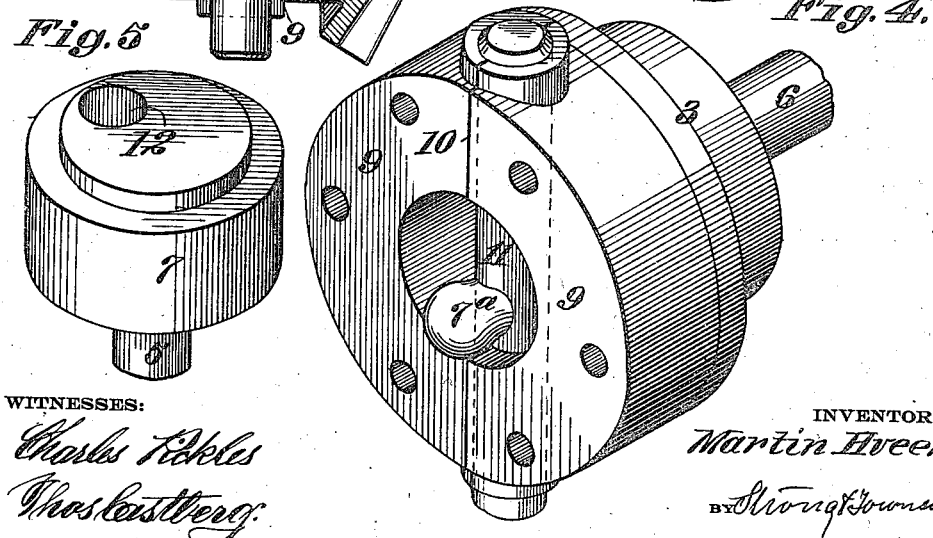
WITNESSES:
Charles Rickles
Thos Castberg
INVENTOR
Martin Hveem
BY Strong & Townsend
ATTORNEYS

UNITED STATES PATENT OFFICE.

MARTIN HVEEM, OF BAYLES, CALIFORNIA, ASSIGNOR OF ONE-FOURTH TO JOHN P. FINNEGAN AND ONE-FOURTH TO SHERMAN BRUNNER, OF LA MOINE, CALIFORNIA.

GEARLESS DIFFERENTIAL DEVICE.

1,224,746.

Specification of Letters Patent.

Patented May 1, 1917.

Application filed December 22, 1915. Serial No. 68,175.

*To all whom it may concern:*

Be it known that I, MARTIN HVEEM, a citizen of the United States, residing at Bayles, in the county of Shasta, and State of California, have invented new and useful Improvements in Gearless Differential Devices, of which the following is a specification.

This invention relates to a differential mechanism and particularly to improvements on a co-pending application entitled differential mechanism, Serial No. 19,678, filed March 27, 1915.

One of the objects of the present invention is to provide a simple, substantial, cheaply manufactured differential mechanism, particularly applicable to driving shafts in motor cars and the like, which is so constructed that compensating movement is obtained without the use of gears and the like now usually employed, thereby simplifying construction and permitting the engine power to be equally transmitted to the driven axles and wheels and at the same time leaving either axle or wheel free to take the initiative during the periods of increased or decreased speed.

Another object of the invention is to provide means for taking up all end thrust transmitted through the rear wheels and driving axles, thus relieving differential mechanism of all unnecessary strain and wear.

The invention consists of the parts and the construction and combination of parts as hereinafter more fully described and claimed, having reference to the accompanying drawings, in which—

Figure 1 is a longitudinal section through the differential mechanism, showing it connected with the rear driving wheels of a car.

Fig. 2 is an enlarged longitudinal section of the differential mechanism.

Fig. 3 is a perspective view of one-half of the bearing ring.

Fig. 4 is a perspective view of the shaft 6, the bearing ring and one-half of casing 2.

Fig. 5 is a perspective view of the axle head.

Referring to the drawings in detail, A indicates a casing which, in this instance, forms a closure for the differential mechanism generally indicated at B. Mounted interiorly of the casing A is a second casing which is divided into two sections, 2 and 3 and extending longitudinally through the casing A and journaled in same, as at 4, are the rear driving axles 5 and 6 of the car. These axles are centrally divided and their inner ends extend through the casing sections 2 and 3, and are provided with enlarged heads 7 and 8. Mounted between the casing sections 2 and 3 is a bearing ring 9 which is centrally divided, as indicated at 10 and extending through said ring at right angles to the axles 5 and 6 between the abutting ends of the heads 7 and 8, is a shaft 11. This shaft is journaled in the bearing ring and is so mounted that it may both reciprocate and turn in said ring. Formed on shaft 11 is a pair of spherical or ball-like projections $7^a$ and $8^a$, and formed in the abutting or adjacent faces of the heads 7 and 8 are recesses 12 and 13, into which the sphere-like projections extend. Projection $7^a$ extends into the recess 12 and the projection $8^a$ into the recess 13. Both recesses 12 and 13 are eccentrically disposed with relation to the center of the heads and casing. Projections $7^a$ and $8^a$ will in this manner form a crank-like connection between the shaft 11 and the axles 5 and 6.

The two casing sections 2 and 3 with the interposed bearing ring 9 are secured together by means of a plurality of bolts 14 and in this manner form a unitary casing which is driven directly from the propeller shaft 15, by means of the bevel gears 16 and 17; gear 17 being secured in any suitable manner exterior of the casing section 3.

Referring to Fig. 2 it will be seen that the interior diameter of the bearing ring is smaller in diameter than the exterior diameter of the heads 7 and 8. This forms one of the important functions of the present invention, as it provides a bearing face or thrust bearing for the heads 7 and 8 which prevents any end thrust imparted to shafts 5 and 6 to be transmitted directly to the projections 7ᵃ and 8ᵃ with connected shaft 11. This structure was not provided in my co-pending application and in actual practice, I found that the end thrust of the shafts 5 and 6 when exerted on the projections 7ᵃ and 8ᵃ causes unnecessary wear of these and also of the bearings in which shaft 11 was mounted. The unnecessary wear and strain caused by this end thrust has, however, been entirely eliminated in the present instance, by permitting the bearing ring to project down between the heads 7 and 8. All end thrust is thus taken up by the bearing ring and all unnecessary wear and strain from this cause, is thus eliminated.

From the foregoing description it will be seen that the differential mechanism as a whole consists of a casing to which rotary movement is transmitted through the gears 16 and 17 and that the rotary movement of the casing is in turn transmitted to the axles 5 and 6 by means of shaft 11 and the spherical projections formed thereon; the couplings formed between the shaft 11 and axles 5 and 6 being in reality nothing more or less than ball and socket joints.

In operation when driving straight ahead, that is when the rear wheels with connected axles 5 and 6 revolve with the same speed, it will be seen that power is transmitted directly from the revolving casing B to the axles 5 and 6, by means of shaft 11 and the spherical projections, said projections forming, in this instance, a crank-like connection between the two axles. As the vehicle passes around a turn, for instance in the direction of arrow a it will readily be seen that the outside wheel 20 with connected axle 5 will be turned a greater number of revolutions than the inner wheel 21 with connected axle 6. This is permitted in the present instance as shaft 11 will reciprocate with relation to the casing B sufficiently to permit projection 7ᵃ to turn in a circle about the center axle 5 with projection 8ᵃ as a center. In fact, it would be possible for axle 6 to remain entirely stationary, while axle 5 is turning. The projection 8ᵃ will in that instance act as a pivot about which projection 7ᵃ turns. The reciprocal movement or mounting of the shaft 11 permits this movement.

A simple, substantial differential movement is thus obtained without the use of gears of any kind; the power from the engine may be readily transmitted to either axle 5 or 6 with connected wheels and the axles will at the same time be free to take the initiative during periods of increased or decreased speed.

The provision of the bearing ring 9 not only forms a thrust bearing which positively removes the objectionable wear and strain previously described, but it also provides a removable part, which when sufficiently worn by general use may be thrown away and replaced by a new bearing ring.

The materials and finish of the several parts of the device may be otherwise such as the judgment and experience of the manufacturer may dictate.

I wish it understood that various changes in form, proportions and minor details of construction may be resorted to within the scope of the appended claims and that I do not wish to limit myself to the specific design and construction here shown.

Having thus described my invention, what I claim and desire to secure by Letters Patent is—

1. A differential mechanism comprising a divided casing, a pair of alined axles journaled in the casing, an enlarged head formed on the inner end of each shaft having opposing faces which are provided with eccentrically arranged recesses, a shaft extending between said opposing faces at right angles to the axles and also journaled in the casing, ball-shaped projections on said shaft engaging in the eccentrically arranged recesses formed in the axle heads, means for revolving the casing, and means for taking up end thrust of the axles against the ball-shaped projections with connected shaft.

2. A differential mechanism comprising a divided casing, a pair of alined axles journaled in the casing, an enlarged head formed on the inner end of each shaft having opposing faces which are provided with eccentrically arranged recesses, a bearing ring secured between the casing sections and between the opposing faces of the axle heads to form a thrust bearing, a shaft extending between said opposing faces at right angles to the axles and journaled in the bearing ring, ball-shaped projections on said shaft engaging in the eccentrically arranged recesses formed in the axle heads, and means for revolving the casing and bearing ring.

3. The combination with the headed ends of the axles, the right angularly disposed shaft provided with the ball-shaped projections which project into the eccentrically disposed recesses in the axle heads, and the casing sections inclosing same, of a bearing ring secured between the casing sections adapted to carry the right-angularly disposed shaft and serve as a thrust bearing for the axle heads.

4. A differential mechanism comprising a divided casing, a pair of alined axles journaled in the casing, an enlarged head formed on the inner end of each shaft having opposed faces which are provided with eccentrically arranged recesses, a shaft extending between said opposing faces at right angles to the axles and also journaled in the casing, projections on said shaft engaging in the eccentrically arranged recesses formed in the axle heads, means for revolving the casing, and means for taking up end thrust of the axles against the projections with connected shafts.

In testimony whereof I have hereunto set my hand in the presence of two subscribing witnesses.

MARTIN HVEEM.

Witnesses:
    JOHN H. HERRING,
    W. W. HEALEY.